Jan. 11, 1944.                T. ZUSCHLAG                2,338,793
                            TESTING APPARATUS
                          Filed May 7, 1942
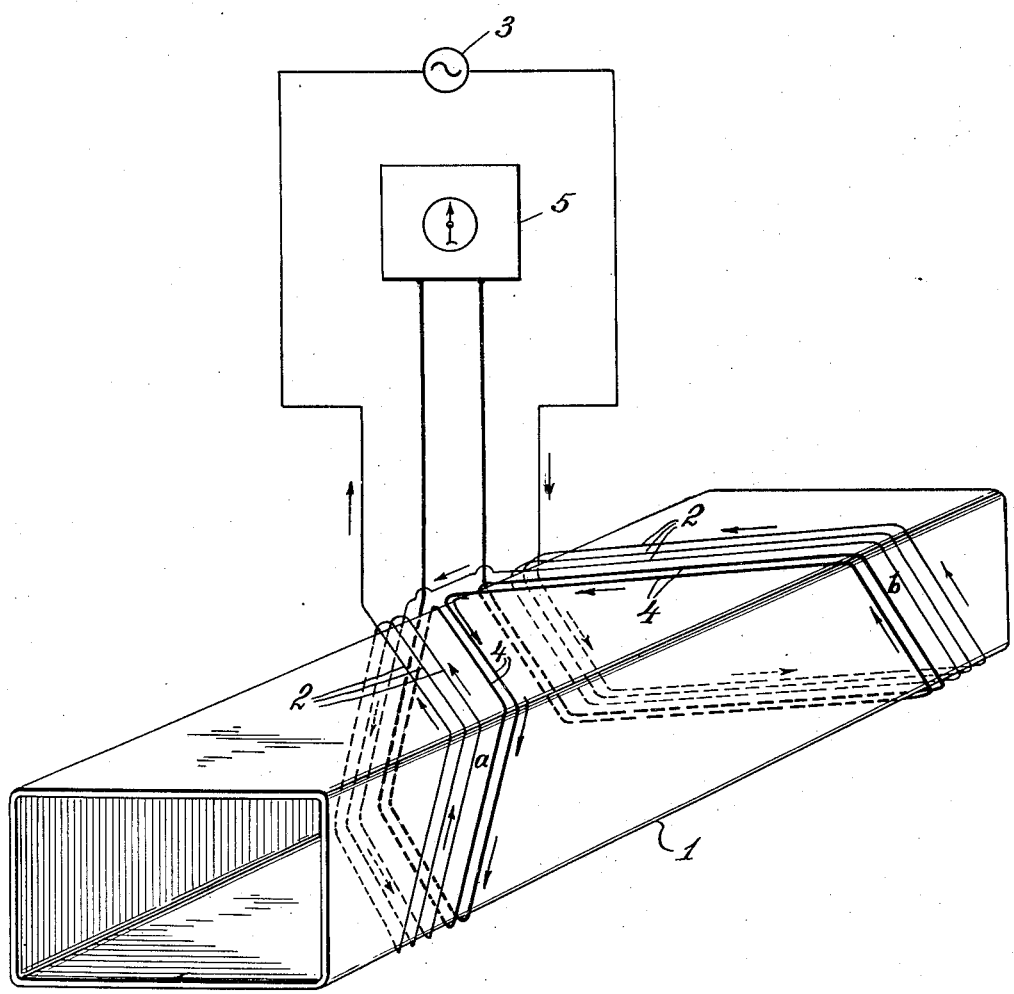
INVENTOR
Theodore Zuschlag Patented Jan. 11, 1944

2,338,793

UNITED STATES PATENT OFFICE 2,338,793

TESTING APPARATUS

Theodore Zuschlag, West Englewood, N. J., assignor to Magnetic Analysis Corporation, Long Island City, N. Y., a corporation of New York Application May 7, 1942, Serial No. 442,041

4 Claims. (Cl. 175—183)

This invention relates to apparatus for testing non-metallic material, such as wood, to detect the presence therein of metallic objects, such as nails.

An example of the type of testing for which the apparatus may be used is that which is performed on boards, rough cut for fabrication into gun-stocks, to detect whether any nails are present in them. The presence of nails interferes with the fabrication of the gun-stocks and must be detected in the rough cut boards to avoid annoying delays in production. Frequently the nails are so completely hidden that a visual inspection will not reveal their presence. On the other hand, passage of the boards through a coil of the type usually used for the inspection of ferro-magnetic material may also prove useless if the nail, when passing through the coil, happens to lie in the general plane of the coil.

It is the purpose of this invention to provide apparatus which is capable of determining the presence of nails, and similar metallic objects, in wood and similar non-metallic material, regardless of the position of the object to be detected.

In accordance with the invention, instead of employing one detector coil through which the material is passed, two of them are used, the coils being so positioned and related that a metal object which the first coil fails to detect, by reason of the position of the metal object, is detected by the second coil. In other words, either one or the other of the coils detects the presence of the metallic object regardless of its position in the material.

One form of apparatus embodying the invention is illustrated diagrammatically and partly in perspective in the accompanying drawing. The two coils are indicated at $a$ and $b$. They preferably encircle a tube or guide 1 made of any suitable non-metallic material and through which the boards to be tested may be passed. The coils are positioned so that any nail which happens to be in a board passes successively through the coils.

As indicated in the drawing the two coils are preferably placed symmetrically divergent when viewed from above and from the side, i. e., they are symmetrically divergent with respect to horizontal and vertical reference planes.

Each coil comprises a primary winding 2 having an appropriate number of turns. The primary windings are connected in series to a suitable source of alternating current indicated at 3. Each coil also comprises a secondary winding 4, of an appropriate number of turns, located adjacent to the primary winding. The secondary windings 4 are connected in series opposition to a suitable indicating instrument represented at 5.

The coils are so arranged that normally the amount of current induced in one secondary winding 4 is exactly equal and opposite to that induced in the other secondary winding and the instrument 5 is in a state of balance and does not show any deflection of the indicating needle. If, however, a board passes through the guide 1 having a nail in it which has an appreciable dimensional component extending longitudinally of the axis of either coil, it will change the normal coupling between the primary and secondary windings of that coil and therefore upset the balance of the indicator. It is obvious that if a nail happens to be in such a position when it passes through one coil that it lies in the general plane of that coil, and for that reason is not detected by that particular coil, it will nevertheless be detected by the other coil. In other words, a nail which is at right angles to the axis of one coil so that it will not be detected by that coil must possess a dimensional component which extends longitudinally of the axis of the other coil and cannot pass through such other coil without being detected.

While the coils are preferably symmetrically divergent when viewed from above and from the side, as stated above, they may, if desired, be divergent when so viewed without being symmetrically arranged. For example, if either coil is disposed as shown in the drawing the other coil may lie in a general plane which is normal to the axis of the guide, or it may be disposed in any other way so long as its general plane is not parallel to the general plane of the first coil. Moreover, the general planes of the coils may be such that the wires of one coil will extend diagonally across the top and bottom of the guide and vertically along the sides, whereas the wires of the other coil may extend straight across the top and bottom of the guide (at right angles to the longitudinal edges of the guide) and diagonally along the sides. In all of these cases the general planes in which the two coils lie are angularly disposed with respect to each other both horizontally and vertically, and a nail which is not detected by one coil will be detected by the other.

Instead of connecting the secondary windings 4 in series opposition they could be connected in bridge relationship in the well known manner so that the needle of the indicator would show a deflection when the balance of the bridge is disturbed by the passage of a nail through one coil or the other. Also the indicator 5 may, if desired, be such as to give an audible alarm or produce a flashing light in any suitable way.

It should be understood that while the apparatus was designed primarily for determining the presence of nails in rough cut boards, it may be used for determining the presence of any other similar metallic object in any non-metallic material. Even if the metallic object is non-ferrous, or non-magnetic, its presence will be detected because it will then have the effect of reducing the normal coupling between the primary and secondary windings of one of the coils instead of increasing such coupling, and this will also result in unbalancing the system and deflecting the needle of the indicating instrument.

I claim:

1. Apparatus for testing non-metallic material to detect the presence therein of metallic objects, comprising a pair of coils arranged so that the material to be tested may be passed through them successively, said coils being so positioned that the general planes in which they lie are angularly disposed with respect to each other both horizontally and vertically, each of said coils comprising a primary and secondary winding, means for supplying alternating current to the primary windings, and means associated with the secondary windings adapted to give an indication when the coupling between the primary and secondary of either coil is altered by the passage through that coil of a metallic object.

2. Apparatus for testing non-metallic material to detect the presence therein of metallic objects, comprising a pair of coils arranged so that the material to be tested may be passed through them successively, said coils being so positioned that the general planes in which they lie are angularly disposed with respect to each other both horizontally and vertically, each of said coils comprising a primary and secondary winding, a source of alternating current, the primary windings of the two coils being connected in series relationship to said source of current, and an indicating device, the secondary windings of the two coils being connected in series opposition to said indicating device.

3. Apparatus for testing non-metallic material to detect the presence therein of metallic objects, comprising a pair of coils arranged so that the material to be tested may be passed through them successively, said coils being positioned so that the general planes in which they lie are angularly disposed with respect to each other both horizontally and vertically and so that the coils are symmetrically divergent when viewed from above and from the side, each of said coils comprising a primary and secondary winding, means for supplying alternating current to the primary windings, and means associated with the secondary windings adapted to give an indication when the coupling between the primary and secondary of either coil is altered by the passage through that coil of a metallic object.

4. Apparatus for testing non-metallic material to detect the presence therein of metallic objects, comprising a hollow guide through which the material to be tested may be passed, a pair of coils encircling said guide and arranged so that the material to be tested may be passed through them successively, said coils being positioned so that the general planes in which they lie are angularly disposed with respect to each other both horizontally and vertically, each of said coils comprising a primary and secondary winding, means for supplying alternating current to the primary windings, and means associated with the secondary windings adapted to give an indication when the coupling between the primary and secondary of either coil is altered by the passage through that coil of a metallic object.

THEODORE ZUSCHLAG.